United States Patent
Blair et al.

(10) Patent No.: US 10,845,076 B2
(45) Date of Patent: Nov. 24, 2020

(54) METHOD OF OPERATING A DIAGNOSTIC DATA BUS IN AN HVAC SYSTEM

(71) Applicant: Trane International Inc., Davidson, NC (US)

(72) Inventors: Daniel John Blair, Tyler, TX (US); Carl L. Garrett, Tyler, TX (US); Mark E. Groskreutz, Tyler, TX (US); Jeffrey L. Stewart, Whitehouse, TX (US); Karl J. Mutchnik, Tyler, TX (US); William David Daugherty, III, Gladewater, TX (US); Mahfuz Imam, Tyler, TX (US); Gang (Jacky) Chen, Tyler, TX (US)

(73) Assignee: Trane International Inc., Davidson, NC (US)

( * ) Notice: Subject to any disclaimer, the term of this patent is extended or adjusted under 35 U.S.C. 154(b) by 77 days.

(21) Appl. No.: 16/199,029

(22) Filed: Nov. 23, 2018

(65) Prior Publication Data
US 2019/0107304 A1 Apr. 11, 2019

Related U.S. Application Data

(62) Division of application No. 15/006,584, filed on Jan. 26, 2016, now Pat. No. 10,139,122.
(Continued)

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
None
See application file for complete search history.

(56) References Cited

U.S. PATENT DOCUMENTS

| 5,729,474 A | 3/1998 | Hildebrand et al. |
| 6,147,601 A | 11/2000 | Sandelman et al. |

(Continued)

*Primary Examiner* — Ramesh B Patel
(74) *Attorney, Agent, or Firm* — The Salerno Law Firm, P.C.

(57) ABSTRACT

A method of operating a diagnostic data collection device and a diagnostic data bus for an HVAC system are disclosed. In an embodiment, the diagnostic data collection device includes a diagnostic communication interface and a flexible interface module. The interface module measures electrical properties associated with an HVAC component. Electrical properties may include a sensor output and may include analog and digital signals. The diagnostic data collection device generates an exception message if the sensed property is out of specification. Evaluation rules are provided to detect various types of failures, including transient failures, steady state failures, and trending failures. The diagnostic data collection device self-calibrates by recording electrical properties during normal operation of the HVAC equipment. A plurality of diagnostic data collection devices may be coupled by a diagnostic data bug independent of the HVAC system's control bus, to ensure operational integrity of the diagnostic system.

7 Claims, 10 Drawing Sheets

Related U.S. Application Data

(60) Provisional application No. 62/107,595, filed on Jan. 26, 2015, provisional application No. 62/107,603, filed on Jan. 26, 2015.

(51) Int. Cl.

| | | |
|---|---|---|
| *G08B 21/18* | (2006.01) | |
| *G05B 23/02* | (2006.01) | |
| *G05B 15/02* | (2006.01) | |
| *F24F 110/00* | (2018.01) | |
| *F24F 11/63* | (2018.01) | |
| *F24F 11/58* | (2018.01) | |

(52) U.S. Cl.
CPC ....... *G05B 23/0227* (2013.01); *G08B 21/187* (2013.01); *F24F 11/58* (2018.01); *F24F 11/63* (2018.01); *F24F 2110/00* (2018.01)

(56) References Cited

U.S. PATENT DOCUMENTS

| | | | |
|---|---|---|---|
| 6,211,782 B1 | 4/2001 | Sandelman et al. | |
| 6,385,510 B1 | 5/2002 | Hoog et al. | |
| 6,437,691 B1 * | 8/2002 | Sandelman | G06F 11/0748 |
| | | | 340/506 |
| 6,462,654 B1 | 10/2002 | Sandelman et al. | |
| 6,535,123 B2 | 3/2003 | Sandelman et al. | |
| 6,553,336 B1 | 4/2003 | Johnson et al. | |
| 6,608,560 B2 | 8/2003 | Abrams | |
| 6,772,096 B2 | 8/2004 | Murakami et al. | |
| 6,891,838 B1 | 5/2005 | Petite et al. | |
| 6,968,295 B1 * | 11/2005 | Carr | G06Q 10/06 |
| | | | 702/188 |
| 7,092,794 B1 | 8/2006 | Hill et al. | |
| 7,139,564 B2 | 11/2006 | Hebert | |
| 7,183,899 B2 | 2/2007 | Behnke | |
| 7,222,048 B2 | 5/2007 | Petchenev et al. | |
| 7,275,377 B2 | 10/2007 | Kates | |
| 7,331,187 B2 | 2/2008 | Kates | |
| 7,343,226 B2 | 3/2008 | Ehlers et al. | |
| 7,383,158 B2 | 6/2008 | Krocker et al. | |
| 7,451,606 B2 * | 11/2008 | Harrod | F24F 11/0086 |
| | | | 62/125 |
| 7,496,472 B2 | 2/2009 | Seem | |
| 7,505,914 B2 | 3/2009 | McCall | |
| 7,536,276 B2 | 5/2009 | Pearson | |
| 7,941,530 B2 | 5/2011 | Ha et al. | |
| 7,966,152 B2 | 6/2011 | Stluka et al. | |
| 8,121,818 B2 * | 2/2012 | Gorinevsky | G05B 23/0281 |
| | | | 702/182 |
| 8,332,178 B2 | 12/2012 | Simons | |
| 8,352,080 B2 | 1/2013 | Grohman et al. | |
| 8,376,242 B1 | 2/2013 | Uselton | |
| 8,539,567 B1 | 9/2013 | Logue et al. | |
| 8,564,400 B2 | 10/2013 | Grohman et al. | |
| 8,589,111 B2 | 11/2013 | Simons | |
| 8,600,556 B2 * | 12/2013 | Nesler | G06Q 50/06 |
| | | | 700/275 |
| 8,600,559 B2 | 12/2013 | Grohman et al. | |
| 8,620,841 B1 | 12/2013 | Filson et al. | |
| 9,644,856 B1 * | 5/2017 | Francis | G05B 15/02 |
| 10,139,122 B2 * | 11/2018 | Blair | G08B 21/187 |
| 2009/0112525 A1 | 4/2009 | Adani | G06Q 10/04 |
| | | | 702/189 |
| 2010/0050756 A1 | 3/2010 | Stewart | |
| 2010/0106312 A1 * | 4/2010 | Grohman | F24F 11/77 |
| | | | 700/276 |
| 2010/0106319 A1 * | 4/2010 | Grohman | G05D 27/02 |
| | | | 700/276 |
| 2010/0206039 A1 | 8/2010 | Kates | |
| 2010/0271217 A1 | 10/2010 | Kates | |
| 2011/0047418 A1 * | 2/2011 | Drees | G05B 23/00 |
| | | | 714/57 |
| 2011/0050410 A1 | 3/2011 | Rezvani et al. | |
| 2011/0061015 A1 * | 3/2011 | Drees | G05B 15/02 |
| | | | 715/771 |
| 2011/0178977 A1 * | 7/2011 | Drees | G05B 23/0229 |
| | | | 706/52 |
| 2012/0022700 A1 * | 1/2012 | Drees | H02J 13/00002 |
| | | | 700/276 |
| 2012/0158932 A1 | 6/2012 | Grohman | |
| 2012/0259583 A1 * | 10/2012 | Noboa | H02J 13/00002 |
| | | | 702/179 |
| 2013/0117267 A1 | 5/2013 | Buryak et al. | |
| 2013/0197698 A1 * | 8/2013 | Shah | F24F 11/30 |
| | | | 700/276 |
| 2013/0241726 A1 | 9/2013 | Hunter et al. | |
| 2014/0009306 A1 | 1/2014 | Haupt et al. | |
| 2014/0214227 A1 * | 7/2014 | Thornton | H02J 9/062 |
| | | | 700/295 |
| 2014/0245071 A1 * | 8/2014 | Drees | G05B 15/02 |
| | | | 714/39 |
| 2014/0277761 A1 * | 9/2014 | Matsuoka | G05D 23/1904 |
| | | | 700/276 |
| 2014/0316743 A1 * | 10/2014 | Drees | G05B 15/02 |
| | | | 702/184 |
| 2015/0061878 A1 * | 3/2015 | Kates | G01N 33/0065 |
| | | | 340/628 |
| 2015/0227870 A1 * | 8/2015 | Noboa | G06Q 10/0635 |
| | | | 705/7.28 |
| 2020/0041967 A1 * | 2/2020 | Shrivastava | G05B 15/02 |

* cited by examiner

"METHOD OF OPERATING A DIAGNOSTIC DATA BUS IN AN HVAC SYSTEM"

CROSS-REFERENCE TO RELATED APPLICATIONS

This application is a Divisional of U.S. Utility patent application Ser. No. 15/006,584, now U.S. Pat. No. 10,139,122, entitled "DIAGNOSTIC DATA BUS FOR ACQUIRING AND COMMUNICATING DIAGNOSTIC INFORMATION FROM HVAC SYSTEMS" and filed Jan. 26, 2016, which claims the benefit of and priority to U.S. Provisional Application Ser. No. 62/107,595 entitled "DIAGNOSTIC DATA BUS FOR ACQUIRING AND COMMUNICATING DIAGNOSTIC INFORMATION FROM HVAC SYSTEMS" and filed Jan. 26, 2015, and U.S. Provisional Application Ser. No. 62/107,603 entitled "REMOTE MONITORING OF AN HVAC SYSTEM FOR FAULT DETECTION AND DIAGNOSTICS" and filed Jan. 26, 2015, the entirety of each of which is hereby incorporated by reference herein for all purposes.

BACKGROUND

1. Technical Field

The present disclosure relates generally to environmental control systems, such as heating, ventilation, and air conditioning (HVAC) systems, and in particular, to improved systems and methods for acquiring and communicating diagnostic information about HVAC system components.

2. Background

A heating, ventilation, and air conditioning (HVAC) system broadly refers to equipment designed and configured to control one or more environmental conditions in a building, such as, but not limited to, temperature, humidity, air quality, or the like. An HVAC system is generally equipped with a number of HVAC components, which can be broadly divided into two types: controllers and demand devices. Examples of a controller are a thermostat and an HVAC system controller. Examples of demand devices include an air handler, condenser, evaporator, heat pump, furnace, chiller, one or more dampers, and so forth, which interact to provide the desired environmental condition within a facility. The function and control of the HVAC demand devices are typically adjusted by controller such as a thermostat or HVAC controller, which may include a number of sensors, such as temperature sensors, air quality sensors, and so forth. Controllers may include scheduling capabilities to adjust the operation of the HVAC system based upon time of day, day of week, and so forth. In some HVAC systems, controllers and demand devices communicate using switched 24V control signals, which will be familiar to one skilled in the art. In other HVAC systems, a digital communication protocol may be employed.

It is well-known that an HVAC system needs proper maintenance to ensure proper and efficient operation, and, occasionally, diagnosis and repair may be needed to correct failures. However, in the case of traditional 24V-controlled HVAC systems, very little diagnostic information is readily available to a service technician, who often must rely solely on troubleshooting skills, pressure gauges, and digital multimeters to isolate faults. A technician working in this manner has a limited perspective, which does not necessarily give a complete overview of the system's condition.

SUMMARY

The present disclosure is directed to a data module that is designed to gather an HVAC system's performance and diagnostic information, and communicate that information via a dedicated data bus, operating independently of the HVAC system, to a remote server for processing and analytics. A system thermostat or controller's existing network connection may be utilized as a gateway between the diagnostic bus and the remote server.

In one aspect, the present disclosure is directed to a data gathering device for use with HVAC equipment. The data gathering device includes a controller; a diagnostic communication interface in operative communication with the controller; and an interface module in operative communication with the controller and configurable to measure an electrical property associated with an HVAC component and generate a sensor signal corresponding to the measured electrical property. In an embodiment, the data gathering device includes a data interface in operative communication with the controller, and the controller is configured to bridge communications between the diagnostic communication interface and the data interface. In embodiments, the diagnostic interface is configured to communicate with a diagnostic data bus in accordance with a protocol selected from the group consisting of a CANbus protocol, Z-Wave® protocol, and a ZigBee® protocol.

In an embodiment, the data gathering device includes an exception module. The exception module includes a baseline setting module operatively coupled to the controller and the interface module. The baseline setting module determines a baseline parameter for the HVAC component. The exception module includes a change detection module storing a parameter rule indicating an acceptable range for an operational parameter. The change detection module is configured to receive the sensor signal, evaluate the sensor signal and the baseline parameter in accordance with the parameter rule, and to issue an exception message if the sensor signal is outside the accepted range defined by the parameter rule. In embodiments, the baseline parameter is determined by sampling an initial value of the measured electrical property. In embodiments, the exception message includes data selected from the group consisting of a data gathering device unique identifier, a data gathering device location, an exception identifier, a sensed parameter, a timestamp, and a unique sequence number. In embodiments, the data gathering unit includes, in operative communication with the interface module, a profile database storing predetermined interface module settings in association with respective identifying characteristics of one or more HVAC components. In embodiments, the interface module further includes an input buffer selectively configurable to receive an electrical property selected from the group consisting of voltage, current, and resistance.

In another aspect, a method of monitoring an HVAC component is disclosed. The method includes selecting an electrical property of the HVAC component for monitoring; determining a baseline parameter of the HVAC component; storing the baseline parameter in a data collection unit; sensing the selected electrical property of the HVAC component during operation of the HVAC component; evaluating, at the data collection unit, the sensed electrical property to the baseline parameter in accordance with a change rule to determine whether the sensed electrical property is indicative of a fault in the HVAC component; and communicating an exception message to a diagnostic database in response to a determination that the sensed electrical property is indicative of a fault in the HVAC component. In an embodiment, determining a baseline parameter includes measuring an electrical characteristic of the HVAC component when the HVAC component is operating without fault. In an embodiment, determining a baseline parameter includes receiving, from a profile database, a predetermined baseline parameter for the HVAC equipment. In an embodiment, the baseline parameter includes an acceptable range, and the change rule includes determining whether the sensed electrical property is outside the acceptable range. In an embodiment, the baseline parameter includes a rate of change and the change rule includes determining whether the sensed electrical property is changing at a rate greater than the rate of change. In an embodiment, communicating an exception message includes transmitting the exception to a second data collection unit via a diagnostic data bus, and forwarding the exception message by the second data collection unit to the diagnostic database. In an embodiment communicating an exception includes transmitting the exception message via a diagnostic data bus to an HVAC device selected from the group consisting of a thermostat and an HVAC controller, and forwarding the exception message by the HVAC device unit to the diagnostic database.

In yet another aspect, an HVAC diagnostic system having a plurality of data gathering devices is disclosed. Each data gathering device includes an interface module configurable to measure an electrical property associated with an HVAC component and each data gathering device is configured to generate an exception message when the measured electrical property is anomalous. The HVAC diagnostic system includes a diagnostic data bus joining the plurality of data gathering devices in operative communication, wherein at least of one of the data gathering devices of the plurality of data devices bridges the diagnostic data bus with a data network; and a server in operative communication with the data network and configured to receive an exception message from the at least one data gathering device, calculate a probability of a fault in HVAC component based on the received exception message, and generate an alert in response to the probability of the fault exceeding a predetermined threshold.

In an embodiment, each of the plurality of data gathering devices further includes an exception module, comprising a baseline setting module operatively coupled to the controller and the interface module, the baseline setting module configured to determine a baseline parameter for the HVAC component; and a change detection module storing a parameter rule indicating an acceptable range for an operational parameter, the change detection module configured to receive the sensor signal, evaluate the sensor signal and the baseline parameter in accordance with the parameter rule, and to issue an exception message if the sensor signal is outside the accepted range defined by the parameter rule. In an embodiment, the baseline parameter is determined by sampling an initial value of the measured electrical property. In an embodiment, the exception message includes data selected from the group consisting of a data gathering device unique identifier, a data gathering device location, an exception identifier, a sensed parameter, a timestamp, and a unique sequence number. In an embodiment, the HVAC diagnostic system includes a database in operative communication with the server, wherein the exception message includes event data that includes a record of an exception event and a date and time of occurrence of the exception event, wherein the server is further configured to aggregate the event data; calculate the probability of the fault based on the aggregated data; and store, in the database, the aggregated data, the probability calculated, and a record of the alert generated.

In still another aspect, an HVAC diagnostic system for use with an HVAC system is disclosed. The HVAC diagnostic system includes a plurality of data gathering devices. Each data gathering device includes an interface configured to measure a property associated with the HVAC system. A diagnostic data bus joins the plurality of data gathering devices in operative communication. At least one of the data gathering devices of the plurality of data devices bridges the diagnostic data bus with a data network. The HVAC diagnostic system includes a server in operative communication with the data network and configured to receive data from at least one data gathering device, determine HVAC system faults utilizing the received data, and generate alerts in response. In an embodiment, the diagnostic data bus is independent of an HVAC system control bus. In an embodiment, the property associated with the HVAC system is selected from the group consisting of a physical parameter and an electrical parameter. In an embodiment, the interface is further configured to communicate with a data port associated with the HVAC system. In an embodiment, the data gathering device is further configured to receive data from the data port, and transmit the data received from the data port to the server.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure.

Figure 1:
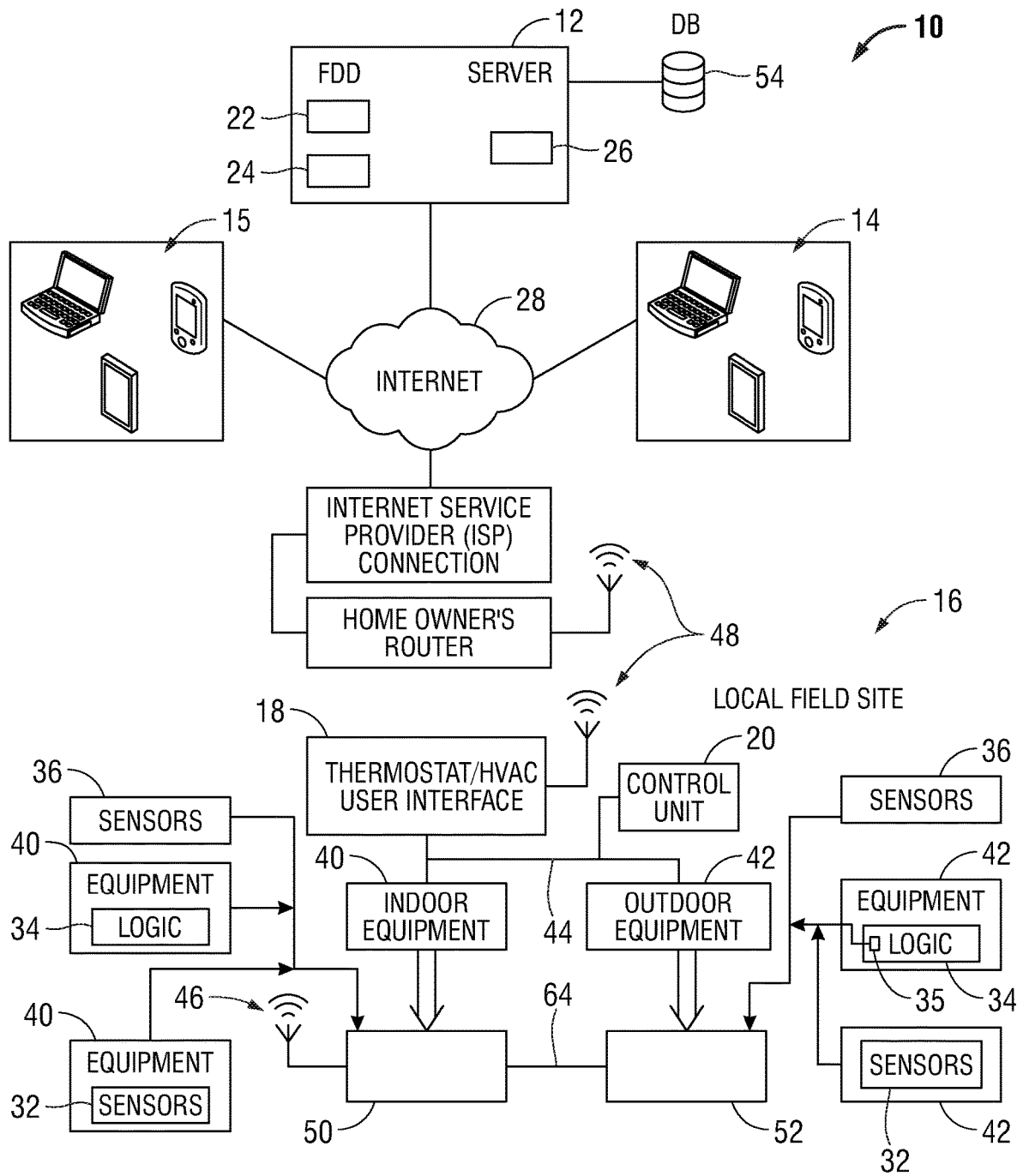
FIG. 1 is a schematic diagram of an embodiment of a system in accordance with the present disclosure communicatively coupled to a heating, ventilation and air conditioning system.

The various aspects of the present disclosure mentioned above are described in further detail with reference to the aforementioned figures and the following detailed description of exemplary embodiments.

DETAILED DESCRIPTION

The present disclosure is directed to a method and system for operating a dedicated data bus established between one or more data modules and a diagnostic database to enable diagnostic information pertinent to each piece of equipment, or component, of the HVAC system to be communicated using a diagnostic communications channel which is isolated from those of the HVAC system. Because the disclosed data bus is operated independently of the HVAC system's control bus, enhanced signal integrity and operational redundancy is achieved, resulting in increased reliability and overall system integrity. In embodiments, the disclosed diagnostic data bus can be wired (e.g., CANBus, RS-485, powerline carrier, Ethernet), wireless (e.g., Wi-Fi, Z-Wave®, Zigbee®, Bluetooth®), and/or combinations thereof.

Diagnostic data is collected by the one or more data modules. The data modules are operatively coupled to HVAC equipment, such as a condenser, evaporator, thermostat, and so forth, and may additionally or alternatively be coupled to a subcomponent of the HVAC equipment, such as, for example, a compressor, a motor, a valve and/or may be coupled to a sensor, such as a pressure sensor, temperature sensor, electrical sensor (e.g., current sensor) and so forth. In certain embodiments, the data module is integrated into the HVAC equipment, and, in other embodiments, the data module is retro-fitted into the HVAC equipment. The flexibility of the disclosed system facilitates its use with any HVAC equipment, regardless of age or manufacturer, to enable the remote monitoring and analysis of data associated with components of an HVAC system for fault detection, troubleshooting, diagnosis, repair and service. Advantageously, embodiments of the disclosed method and system enable the early detection of degradation in performance, thereby potentially preventing major equipment damage before it occurs.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

Embodiments of methods of the present disclosure are described herein in terms of functional block components which may correspond to one or more various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Referring to an embodiment of a system 10 of the present disclosure as shown in FIG. 1, for example, in various embodiments, the hardware and/or software components for implementing one or more of the functional blocks or method steps may be implemented on one or more server(s) 12 or distributed between any combination of one or more server(s) 12, a user device 14, 15 operably connected to an HVAC system 16, a thermostat 18 in the HVAC system 16, a control unit 20 in the HVAC system 16, and one or more data gathering devices 50, 52.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any suitable processing device, on a variety of operating systems, including without limitation Apple OSX®, Apple iOS®, Google Android®, HP WebOS®, Linux, UNIX®, Microsoft Windows®, and/or Microsoft Windows Mobile®.

It should be appreciated that the particular implementations described herein are illustrative of the disclosure and its best mode and are not intended to otherwise limit the scope of the present disclosure in any way. Examples are presented herein which may include sample data items which are intended as examples and are not to be construed as limiting. Indeed, for the sake of brevity, conventional data networking, application development and other functional aspects of the systems (and components of the individual operating components of the systems) are not described in detail herein. It should be noted that many alternative or additional functional relationships or physical or virtual connections may be present in a practical electronic system or apparatus.

As will be appreciated by one of ordinary skill in the art, the present disclosure may be embodied as a method, a device, e.g., a server device, configured to implement the methods disclosed herein, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., flash memory, USB thumb drives) and/or the like.

Computer program instructions embodying the present disclosure may also be stored in a computer-readable memory that can direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

Referring again to FIG. 1, for example, in one embodiment, the server 12 includes at least a processing device or devices 22, memory including computer readable memory or storage 24 for storage of software, instructions, or executable code, which when executed by the processing device(s) 22 causes the processing device(s) 22 to perform methods or method steps of the present disclosure, which may be embodied at least in part in programming instructions 26 stored on or retrievable by the server 12. It will be appreciated by those of ordinary skill in the art that such components 22, 24 and programming instructions 26 for performing the methods or method steps of the present disclosure may be also be distributed among various devices, which may include user devices 14, 15 such as computers, laptops, mobile devices, phones, tablets, and so on, and programmable logic installed in the thermostat 18 and/or control units 20 in the HVAC system.

It should be appreciated by those of ordinary skill in the art that the disclosed methods may also be embodied, at least in part, in application software that may be downloaded, in whole or in part, from either a public or private website or an application store ("app store") to a user device such as a mobile device including a phone, tablet and so on. In another embodiment, the disclosed system and method may be included in the mobile device firmware, hardware, and/or software. In another embodiment, the disclosed systems and/or methods may be embodied, at least in part, in application software executing within a webserver to provide a web-based interface to the described functionality.

In yet other embodiments, all or part of the disclosed systems and/or methods may be provided as one or more callable modules, an application programming interface (e.g., an API), a source library, an object library, a plug-in or snap-in, a dynamic link library (e.g., DLL), or any software architecture capable of providing the functionality disclosed herein.

The term "sensors" as used herein refers collectively to both sensors and transducers as commonly used in the art, and includes sensors associated with a particular piece of equipment and/or control unit in the HVAC system, such as a temperature sensor in a thermostat. Sensors may be located on or operably connected to certain HVAC equipment. Other sensors co-located with an HVAC system may, or may not be operably connected to HVAC equipment, but may still be used in accordance with methods of the present disclosure to analyze the data collected for detecting a probability of a fault in the HVAC equipment. Examples of sensors from which data may be collected for analysis in accordance with the present disclosure include, but are not limited to, voltage, current, resistance, temperature, humidity, pressure, occupancy, smoke, light, motion, security sensors, and so on.

Data that may be acquired from sensors and/or equipment (which may include sensors or embedded controllers) includes, but is not limited to, measured data readings (e.g., impedance, frequency, phase angle, jitter, temperature, pressure, humidity, and so on), set point (e.g., a user-defined temperature setting), current state (e.g., an "occupied" or "unoccupied" reading from an occupancy sensor), and modes of operation (e.g., heat or cool mode of a thermostat).

The term "identifying criteria" as used herein refers to any data or identifier used to identify a particular piece of equipment or sensor, for example, without limitation, its location, or a category or type of the piece of equipment or sensor, and may include a type, model, serial number, manufacturer, dealer, and so on.

The term "user" is collectively used to refer to any user of the system of the present disclosure, which can include a manager/operator (for example, a home owner, or a building manager/operator) of an HVAC system, a dealer or manufacturer of certain HVAC equipment being monitored, and others. Different categories of users may have different types of access to the data generated by the methods and system of the present disclosure. A suitable user device includes a computer or mobile device, including a smart phone, tablet, personal digital assistant and so on, that can be configured for a particular user. In embodiments, a user device configured for a manager/homeowner can also be used to monitor and control the HVAC system.

A "fault" as used herein refers to a departure from an acceptable range of one or more operating parameters. In the present disclosure, a probability of a fault occurring is calculated, and alerts may be triggered based on the probability exceeding a predetermined threshold, so that the possibility of a fault occurring may be predicted before the fault occurs, and before any damage to equipment occurs. As one of ordinary skill in the art will appreciate, a probability of one (1) will then indicate the presence of a fault, i.e., operation of a piece of equipment outside of the acceptable range. In some embodiments in accordance with the present disclosure, however, there may be a range of probabilities that indicate the presence of a fault in a particular piece of equipment.

Referring to FIG. 1, an embodiment of a system 10 of the present disclosure for detecting and diagnosing faults in a heating, ventilation and air conditioning (HVAC) system 16 is shown. The system 10 includes a server 12 communicably coupled to the HVAC system 16 and specially configured to implement and execute the methods of the present disclosure. The server 12 may also be configured to establish communications between user devices 14 and the HVAC system 16, via the Internet 28, for controlling a thermostat and, optionally, other units that may be included in a home automation system via their user devices 14. Accordingly, the server 12 may be configured to send various alerts in accordance with the present disclosure to the same user devices 14 used for home automation. In additional embodiments, the server 12 can send other types of information to other user devices 15 configured for appropriate access by dealers and/or manufacturers of equipment in the HVAC system 16.

Referring still to the embodiment of FIG. 1, the HVAC system 16 includes a thermostat 18 and may include various additional control unit(s) 20, each of which may be operable via a touch-screen panel as well as via user devices 14 operated by a homeowner, for example, of the system 16. Additional equipment in the HVAC system 16 may include, but is not limited to, furnaces and heating equipment, air conditioners, filters, air purifiers, ventilation equipment, chillers, pumps, and air handlers.

The equipment may include both indoor equipment 40 and outdoor equipment 42, each of which may include sensors 32 operably connected to and/or embedded in the equipment. Indoor equipment 40 may include, but is not limited to, an air handler, a furnace, an evaporator, a variable air volume (VAV) device, and so forth. Outdoor equipment may include, but is not limited to, a condenser, a heat pump, a compressor, a geothermal unit, and so forth.

Thermostat 18 and control unit(s) 20 are in operative communication with indoor equipment 40 and outdoor equipment 42 via an HVAC control bus 44. In embodiments, HVAC control bus 44 may include a standard 24V control circuit, such as, without limitation, a three-wire system (e.g., 24 v, ground, and call for heat), a four-wire system (e.g., 24 v, ground, call for heat, fan control), a five-wire system (e.g., 24 v, ground, call for heat, fan control, call for cooling), and other like control schemes known in the art. In embodiments, HVAC control bus may include a bidirectional serial communications bus, such as, without limitation, RS-485; a wireless network (WiFi, Z-Wave®, etc.), and any other suitable control or signaling scheme known in the art.

Some equipment may include embedded logic controllers 34 for monitoring and controlling operation. Embedded logic controller 34 may include a data port 35 which includes the capability of communicating data to and/or from embedded logic controller 34.

Additional sensors 36 may be co-located with the system 16 and may or may not be operably connected to equipment within the HVAC system 16. Such sensors 36 may include, but are not limited to, occupancy, smoke, light, motion, security, humidity, pressure sensors, and so on. As described further herein, in various embodiments of the present disclosure, data from these sensors 36 is collected, stored, and analyzed along with data from equipment in the HVAC system 16, including data from sensors 32 and embedded logic controllers 34, to assess current operational parameters and trends in the equipment and HVAC system 16. The data is then analyzed to detect and diagnose faults, as well as to predict the probability of a fault occurring in any piece of equipment if the condition is not corrected within a certain period of time.

As described in detail below, various types of data are generated by the sensors associated with the HVAC system 16. Referring still to FIG. 1, embodiments of the HVAC system 16 in accordance with the present disclosure include one or more data gathering devices 50, 52 configured to acquire data from any components associated with the system 16, including the control unit(s) 20, thermostat 18, both indoor 40 and outdoor equipment 42, and other sensors 36, and forward the data via the Internet 28, for example, to the server 12 for processing. Though only one HVAC system is shown in FIG. 1, in embodiments of the present disclosure, data may be collected by the server 12 for processing from a plurality of HVAC systems. By collecting data from a plurality of HVAC systems, more accurate models can be developed for predicting faults in different types of equipment from sensor data within an HVAC system.

The data gathering devices 50, 52 are operatively coupled with the HVAC system 16 for gathering and transmitting data to the server 12. For example, the data gathering devices 50, 52 may be located in, on, or in proximity to an indoor air handling or indoor furnace unit for acquiring data associated with such indoor components, and/or may be located in, on, or in proximity to an outdoor condenser, heat pump, or geothermal unit for acquiring outdoor-type HVAC system data.

The data gathering devices 50, 52 may be part of the system 16 upon installation (e.g., integrated), or, in some embodiments, configured for integration with an existing HVAC system (e.g., retro-fitted). In various embodiments, the data gathering devices 50, 52 may be any one of a data acquisition and measurement device, a printed circuit board assembly, a control unit, a system, and so on that is configured to acquire the data from the various components in and near the HVAC system 16 and communicate the acquired data to the remote server 12. In some embodiments, the data gathering device is also configured to receive serial data from embedded logic controllers 34 within the HVAC equipment and forward the serial data to the server 12. Data that is received by the server 12 may be stored in a database 54 that is in operative communication with server 12.

Figure 1A:
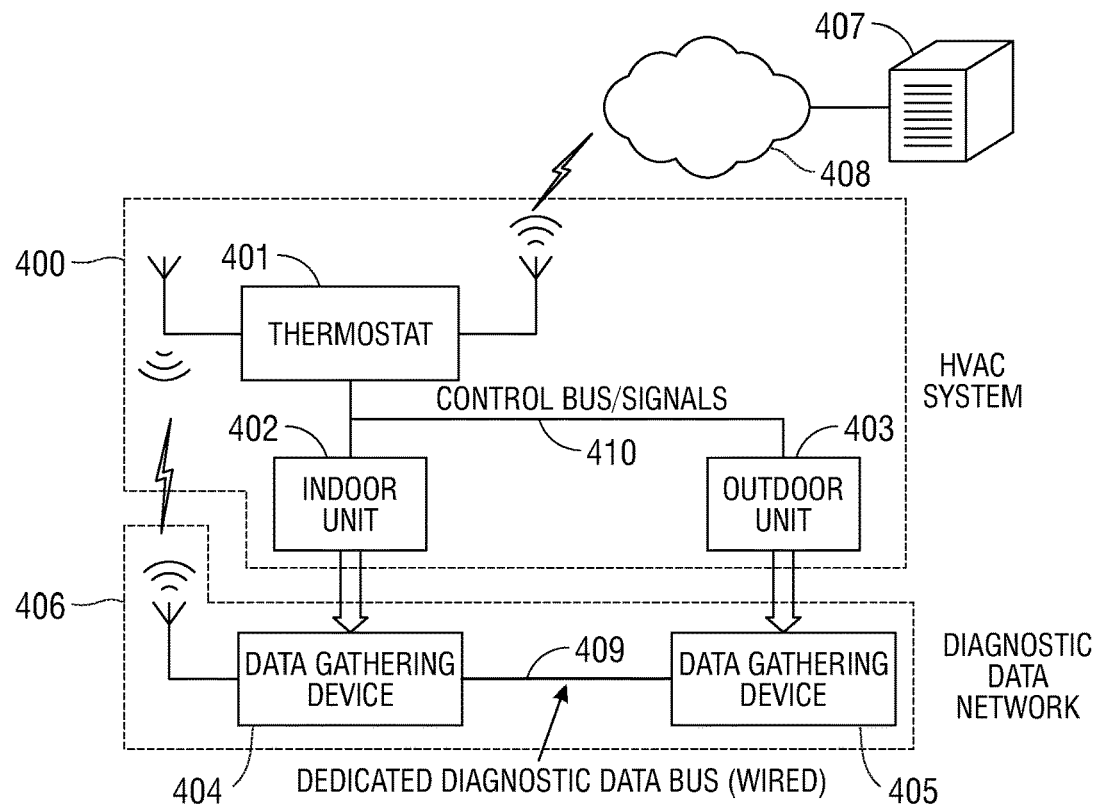
FIG. 1A is a schematic diagram on an embodiment of an HVAC system having a wired diagnostic data bus in accordance with the present disclosure.
Figure 1B:
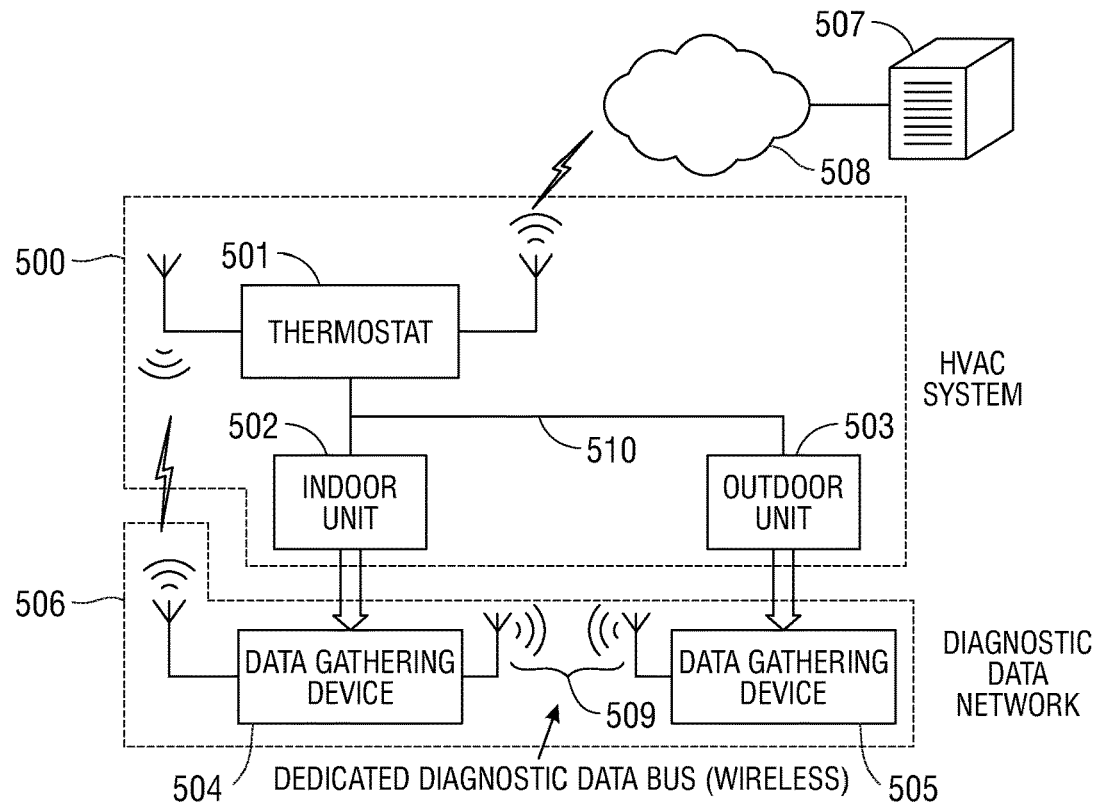
FIG. 1B is a schematic diagram on an embodiment of an HVAC system having a wireless diagnostic data bus in accordance with the present disclosure.

Example embodiments of a diagnostic data bus in use with an HVAC system are shown in FIGS. 1A and 1B. In FIG. 1A, an HVAC system 400 includes an indoor unit 402, an outdoor unit 403, and a thermostat 402. Indoor unit 402, outdoor unit 403, and thermostat 401 operatively communicate via control bus 410. In an embodiment, indoor unit 402 includes an air handler and outdoor unit 403 includes a heat pump or air conditioning (A/C) compressor. Thermostat 401 is in operative communication with a remote server 407 via a network link 408. HVAC system 400 is associated with HVAC diagnostic system 406 that includes a first data gathering device 404 that is in operative communication with indoor unit 402, and gathers diagnostic data relating to one or more physical and/or electronic properties of indoor unit 402. A second data gathering device 405 is in operative communication to outdoor unit 403 and gathers diagnostic data relating to one or more physical and/or electronic properties of outdoor unit 403. First data gathering device 404 and second data gathering device 405 are joined in operative communication by dedicated wired data bus 409. In certain embodiments, dedicated wired data bus 409 operates in accordance with the CANbus standard. First data gathering device 404 is in operative communication with thermostat 401 via data link 410. In embodiments, data link 410 may include a wireless data link operating in accordance with an IEEE 802.15.4 standard, such as, without limitation, Z-Wave® or ZigBee®. In embodiments, data link 410 includes a wireless data link operating in accordance with one or more of the IEEE 802.11 standards collectively known in the art as WiFi. In embodiments, data link 410 includes a wired connection (Ethernet, RS-485, or other suitable hardwired signaling protocol).

In use, data gathering devices 404, 405 collect operational data from indoor unit 404 and outdoor unit 403, respectively. Data gathering device 405 transmits its collected data to data gathering device 404, which, in turn, transmits the data received by data gathering device 405, together with data collected by data gathering device 404, to thermostat 401 via data link 410.

As shown, data gathering device 404 is coupled via data link 410 to thermostat 401. This arrangement is suitable in a common scenario where indoor components of an HVAC system are physically located closer to thermostat 401 than the outdoor components. However, in embodiments, for example, where thermostat 401 is located closer to the outdoor components, the outdoor data gathering device 403 may be configured to communicate via data link 410 to thermostat 401. The present disclosure contemplated that an installer may elect either of these configurations, or another configuration, to optimize wireless signal transmission and/or to otherwise facilitate the installation of the various components described herein.

FIG. 1B discloses another embodiment wherein HVAC system 500 is associated with HVAC diagnostic system 506. In this embodiment, data gathering device 504 and data gathering device 505 are joined in operative communication by dedicated wireless data bus 509. In embodiments, dedicated wireless data bus 509 operates in accordance with an IEEE 802.15.4 standard, such as, without limitation, Z-Wave® or ZigBee®. In embodiments, dedicated wireless data bus 509 operates in accordance with one or more of the IEEE 802.11 WiFi standards.

Figure 2:
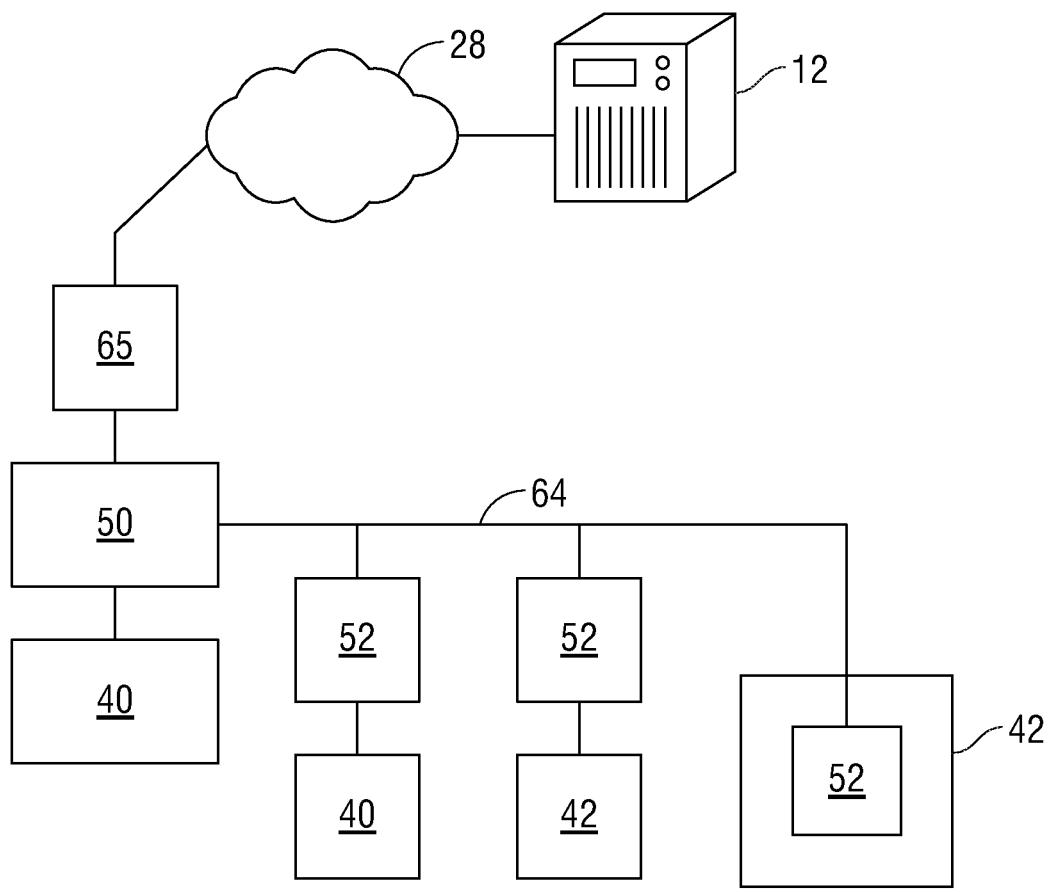
FIG. 2 is a block diagram of a diagnostic data bus interconnecting a plurality of data collection units in accordance an embodiment of the present disclosure.
Figure 3A:
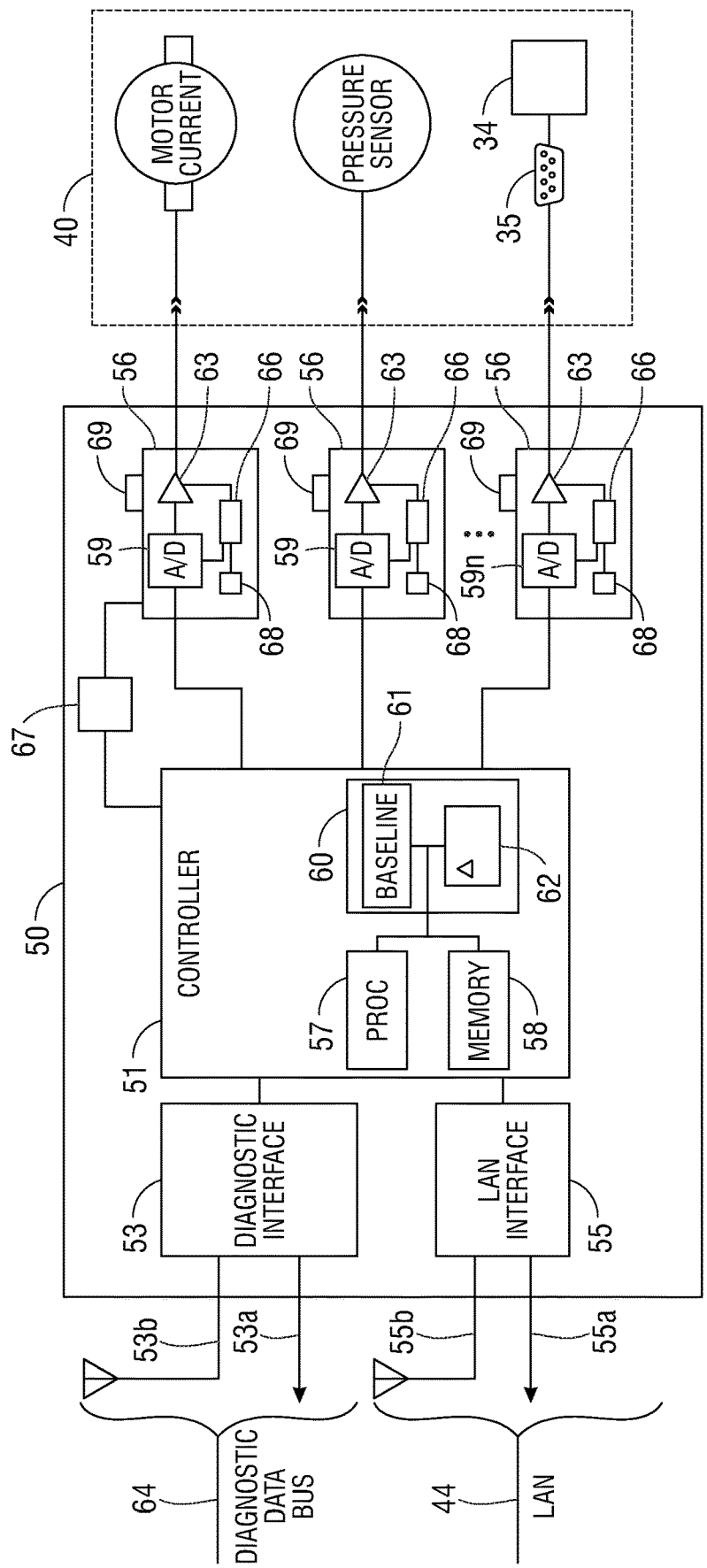
FIG. 3A is a block diagram of an embodiment of a first data collection unit in accordance with the present disclosure.
Figure 3B:
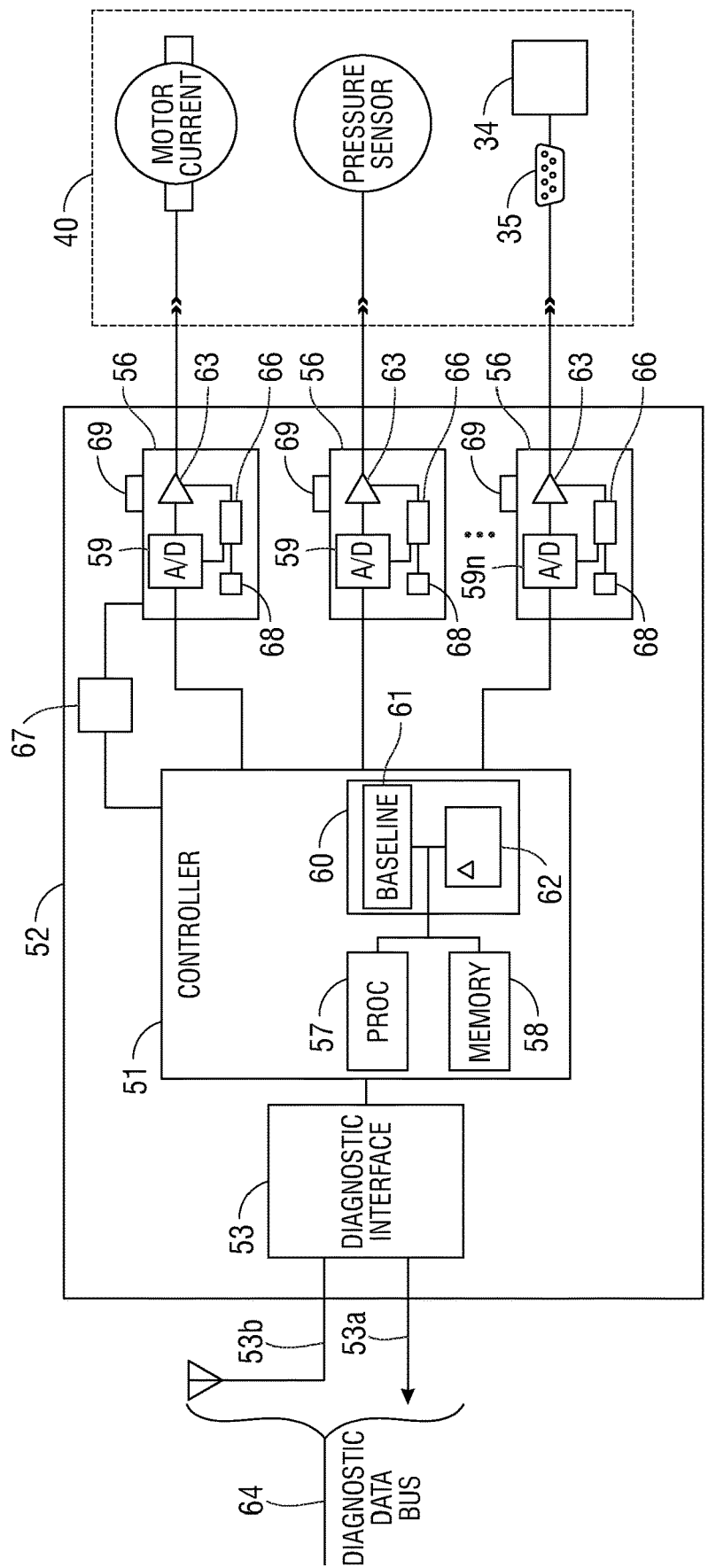
FIG. 3B is a block diagram of an embodiment of a second data collection unit in accordance with the present disclosure.

In an exemplary embodiment shown in FIG. 2, data gathering devices 50, 52 are in operative communication via a diagnostic data bus 64. The example embodiments discussed herein illustrate two types of data gathering devices shown as data gathering device 50 and data gathering device 52. FIG. 3A illustrates an exemplary embodiment of data gathering device 50 having a diagnostic bus interface 53, a LAN interface 55, and one or more equipment interfaces 63. Data gathering device 50 may be utilized as a gateway between diagnostic data bus 64 and an external network, such as the Internet, to facilitate delivery of diagnostic information to server 12. FIG. 3B illustrates an exemplary embodiment of data gathering device 52 having a diagnostic bus interface 53 and one or more equipment interfaces 63. Data gathering device 52 is designed to be installed in equipment where access to LAN communication is unavailable or unnecessary, for example, where the desired function of data gathering device 52 is to monitor one or more operational parameters of equipment 40 and convey operation assessments via diagnostic data bus 64 to a LAN-enabled data gathering device 50 for forwarding to server 12 via the Internet 28. Depending upon the local network topology, data gathering device 50 may be connected to the Internet 28 via one or more intervening network devices 65, which may include, without limitation, a router, a switch, a WiFi router, a WiFi access point, a firewall, and/or any other network devices now or in the future known in the art. In some embodiments, Internet connectivity may be provided by thermostat 18.

Diagnostic data bus 64 interconnects data gathering devices 50, 52. In an embodiment, diagnostic and other data is communicated over diagnostic data bus 64 using a controller area network protocol, sometimes referred to as CANbus. In these embodiments, diagnostic data base 64 includes a two-wire connection shared between data gathering devices 50, 52. Advantageously, the controller area network protocol used in the disclosed embodiments efficiently communicates messages up to eight bytes in size, supports a multi-master access networking methodology whereby collisions are arbitrated according to message priority, and includes a 15-bit cyclic redundancy check (CRC) which provides reliability and data integrity. In an embodiment, the diagnostic data bus communicates using a wireless communications protocol, such as, without limitation, WiFi, Z-Wave®, ZigBee®, Bluetooth®, and the like.

Independence of diagnostic data bus 64 from control bus 44 ensures that a system fault which impairs the operation of the control bus 44 does not compromise the diagnostic capabilities of the system or that of diagnostic data bus 64. In some embodiments, this independence is achieved by physical isolation where separate transmission media (e.g., separate wiring or separate wireless networks) is used for diagnostic data bus 64 and control bus 44. In some embodiments, independence is achieved by logical independence, where diagnostic data bus 64 and control bus 44 share a common transmission media but are otherwise functionally isolated. For example, in embodiments where diagnostic data bus 64 and control bus 44 share a common transmission media utilizing internet protocol, diagnostic data bus 64 is communicated using IP tunneling within control bus 44. In embodiments, a virtual private network (VPN) may be employed whereby data gathering devices 50, 52 are connected via an encrypted point-to-point connection between diagnostic data bus 64 and server 12.

In some embodiments, a thermostat 18 of the HVAC system is operably connected to at least one of the data gathering devices 50, 52, includes Internet connectivity 48, e.g., WiFi, Ethernet, and so forth, and may provide a data gateway from the data gathering devices 50, 52 to the central remote server 22 via the Internet 28. In these embodiments, no additional hardware is necessary in system 16 to serve this purpose, and removes the requirement for a data gathering device 50, 52 to have WiFi, Ethernet, cellular, or land line range and connectivity to the server 12. The thermostat can acquire data from sensors integrated with the thermostat, data acquired via external sensors, e.g. temperature and humidity sensors, etc., and data acquired by the one or more data gathering devices 50, 52. The collected data is forwarded by thermostat 18 via the Internet 28 to remote server 12.

In some embodiments, the thermostat 18 is configured to provide the functionality of a data gathering device 50, 52 by collecting additional data from equipment and co-located sensors, e.g., as well as from other control units if present, and sending the data along with the internal thermostat data to the remote server 12 for processing.

In some embodiments, communication between the data gathering devices 50, 52 and the server 12 is bidirectional. In other embodiments, the communication is unidirectional from the data gathering device 50, 52 to the remote server 12.

Referring still to FIG. 1, in some embodiments, the data gathering devices 50, 52 may acquire data via serial communication from embedded logic controllers 34 included in various pieces of equipment within the HVAC system 16, as well as via wired or wireless sensors. In embodiments, a first data gathering device 50 may be operably associated with an indoor HVAC component 40, such as, without limitation, an air handler or furnace, and a second data gathering device 52 may be operably associated with an outdoor unit 42 of the HVAC system 16.

Referring again to FIGS. 3A and 3B, data gathering devices 50, 52 include a number of elements which facilitate the collection of HVAC operational data, analysis of the collected data, and transmission of HVAC operational and diagnostic data via diagnostic data bus 64. Controller 51 is in operative communication with one or more interface modules 56 which are configured to receive operational data from HVAC equipment 40, and with a diagnostic interface 53 that communicably couples controller 51 with diagnostic data bus 64. Diagnostic interface 53 may include a wired connection 53a (e.g., CANbus) and/or a wireless connection 53b (e.g., Z-Wave®, ZigBee®) to diagnostic data bus 64. Data gathering device 50 includes LAN interface 55 which may include a wired connection 55a (e.g., Ethernet) and/or a wireless connection 55b (e.g., WiFi) to relay diagnostic information to server 12 as described herein.

Interface module 56 collects data from HVAC component 40 for processing and analysis by controller 51. Since data gathering devices 50, 52 may be used with a variety of HVAC equipment, having various electrical and physical parameters which may be monitored, interface module 56 is designed to be flexible to readily accommodate the measurement of any of voltage, current (AC and/or DC), resistance, phase, frequency, etc., which may represent a raw operating parameter of the HVAC module being monitored (e.g., motor current, power supply rail voltage) or a sensor output (e.g., output of a flame detector photosensor, pressure sensor, RPM sensor etc.). Other parameters which may be monitored include, but are not limited to, return air temperature, static pressure, gas temperature, liquid temperature, evaporator temperature, condensate overflow, motor torque, motor RPM, and so forth.

Interface module 56 includes an input buffer 63 that is operatively coupled with an encoder 59. In embodiments, input buffer 63 is selectively configurable to receive the type of electrical property corresponding to the particular subcomponent of HVAC equipment to which input buffer 63 is attached (e.g., voltage, current, resistance, and/or sensor output) and provide a data signal representative of the sensed property to encoder 59. In embodiments, input buffer 63 provides galvanic isolation between data gathering device 50, 52 and the monitored HVAC equipment. In embodiments, input buffer 63 includes an opto-isolator and/or a transformer to achieve galvanic isolation. In embodiments, input buffer 63 includes the capability to perform auto-ranging, e.g., to automatically sense and adapt to the type of circuit to which it is connected. In embodiments, input buffer 63 includes overload protection, such as without limitation, overvoltage protection and/or overcurrent protection to reduce the risk of damage to data gathering device 50, 52 in the event of a catastrophic failure, lightning strike, improper installation, and/or other severe conditions.

In embodiments where data gathering device 50, 52 is configured to monitor a data port 35 of an embedded logic controller 34 of an HVAC component, input buffer 63 includes digital interface circuitry which adapts the signaling protocol used at data port 35 to a form suitable for use internally by data gathering device 50, 52. For example, input buffer 63 may include a logic inverter, a universal asynchronous receiver-transmitter (UART), a LIFO buffer, a USB transceiver, or other digital interfacing element which facilitates interoperability between data gathering device 50, 52 and embedded logic controller 34.

Interface module 56 includes an encoder 59 which receives the data signal from input buffer 63 and encodes the sensed properties into a form suitable for use by controller 51. In embodiments, encoder 59 may include an analog to digital (A/D) converter that is adapted to translate analog electrical signals into binary form for processing by controller 51. Encoder 59 may additionally or alternatively be configured to normalize or scale the measured signal into an expected range of values. In embodiments, any non-linear or exponential properties of a sensed parameter (e.g., the knee of a thermistor curve) may be linearized by encoder 59 by, for example, a lookup table, a numerical method, or a mathematic formula as required. In embodiments where data gathering device 50, 52 is monitoring a data port 35, encoder 59 may perform further translation, mapping, or normalization to the raw digital data transmitted by embedded logic controller 34 into a form suitable for use by controller 51.

Interface module 56 includes a selector unit 66 to facilitate the configuration of data gathering device 50, 52 in a setup mode, to prepare data gathering device 50, 52 for use with the intended HVAC equipment. Selector unit 66 may be used by an technician to instruct the input buffer 63 and/or the encoder 59 to operate in the desired monitoring mode, e.g., voltage monitor, current monitor, AC or DC, resistance monitor, range, scaling, linearity, and so forth. One or more exception rules may additionally or alternatively be defined, as described in more detail below. Selector unit 66 may include, in operative communication, a profile database 67 which stores predetermined interface module settings indexed by the type, make, model or other identifying characteristics of individual HVAC equipment for which the predetermined interface module settings apply (e.g., an HVAC equipment profile). Additionally or alternatively, the database stores settings which are not specific to any particular HVAC equipment but which may be used as a baseline when predetermined settings are not available. In embodiments, the database is updated as needed with revised and/or additional profiles obtained from a remote server (e.g., server 12) and communicated through diagnostic data bus 64 and/or LAN 44 via controller 51.

Selector unit 66 includes a user interface 68, which may include one or more switches (e.g., a DIP switch), pin headers and jumpers, a rotary control, a download port, and/or a software-based user interface accessible to a user device which enables command-line, graphical, or web-based (HTML) configuration of data gathering unit 50, 52. In embodiments, an equipment profile may be downloaded to interface module 56 via a download port 69. Such embodiments may be advantageous in a manufacturing scenario, enabling a single data collection device 50, 52 to be kept in inventory and programmed to work with different kinds of HVAC components in production.

Controller 51 receives the sensed HVAC properties from interface module 56. Controller 51 includes in operative communication a processor 57, memory 58 (which may include both memory which is volatile, e.g., transitory, and memory which is non-volatile, e.g., non-transitory and/or persistent though power cycles), and an exception module 60. Exception module 60 includes a baseline setting module 61 and a change detection unit 62. Upon first use of data gathering device 50, 52, baseline setting module 61 establishes the baseline parameters for the attached HVAC equipment 40. Baseline parameters may include a desired, target, or optimal operating range for the monitored parameter (e.g., motor current, etc.) In some embodiments, baseline setting module 61 establishes baseline parameters based upon predetermined data obtained from the HVAC equipment profile. These embodiments may be suitable where, for example, data gathering device 50, 52 is integrated into HVAC equipment 40 and the operating parameters for the monitored HVAC component are known, or where a predetermined HVAC equipment profile was used to configure interface module 56. In some embodiments, baseline setting module 61 establishes the baseline parameters for the attached HVAC equipment 40 based upon a sampling of the monitored parameters taken during an initial calibration phase, e.g., the first time or the first few times that data gathering device 50, 52 and HVAC equipment 40 are powered up together. In these embodiments, it is advisable that HVAC equipment 40 be in proper working order before the baseline parameters are established. In data gathering device 50, controller 51 is additionally configured to bridge communications between diagnostic data bus 62 and LAN 44. In this manner, communication between other data gathering devices 50, 52 connected to diagnostic data bus 64 and server 12 is facilitated.

During use, or run mode, change detection unit 62 receives the sensed property of HVAC unit 40 from interface module 56 and applies a change rule to the property to determine whether an exception should be issued to server 12. One such change rule compares the sensed property to the operating range established by the base parameters, determines whether the value of the sensed property indicates that a fault condition exists, e.g., that the sensed property is anomalous or outside the operating range. In the event of such an out-of-range determination is made, change detection unit 62 signals an exception to processor 57, which, in turn, sends a diagnostic exception message to server 12 via diagnostic data bus 64 (data gathering device 52) or via LAN (data gathering device 50). Using another change rule, change detection unit 62 determines whether an increased likelihood exists that a fault is imminent. Under this rule, change detection unit 62 attempts to identify change patterns in the sensed property that correlate with an increased likelihood of a pending failure. For example, an upward trend in motor current may indicate that a bearing failure or compressor failure is likely, and therefore change detection unit 62 will flag an exception even though the motor current may still be within the accepted operating range. In another rule example, transient fluid pressure above the normal operating range may be acceptable on a transient basis however a prolonged elevated fluid pressure may indicate a failure. Under this rule, change detection unit 62 will flag an exception if the sensed property (here, fluid pressure) is outside the accepted range for more than a predetermined period of time, e.g., more than thirty seconds. In yet another change rule example, change detection unit 62 may flag an exception if a sensed property falls outside the accepted range more than a predetermined number of times within any given predetermined time period, regardless of the duration of the event (e.g., a motor power cycle occurs more than twice in any given five minute period). The described change rules, as well as others, may be applied in any combination, with respect to a single sensed parameter. In embodiments where a data gathering device 50, 52 includes a plurality of interface modules 56 connected to various subcomponents of HVAC equipment 40, rules pertaining to multiple sensed parameters may be combined, in any suitable combination, to identify anomalies characterized by the interaction of related HVAC subcomponents (e.g., increasing motor RPM accompanied by a decrease in fluid pressure may indicate a refrigerant leak).

Figure 4:
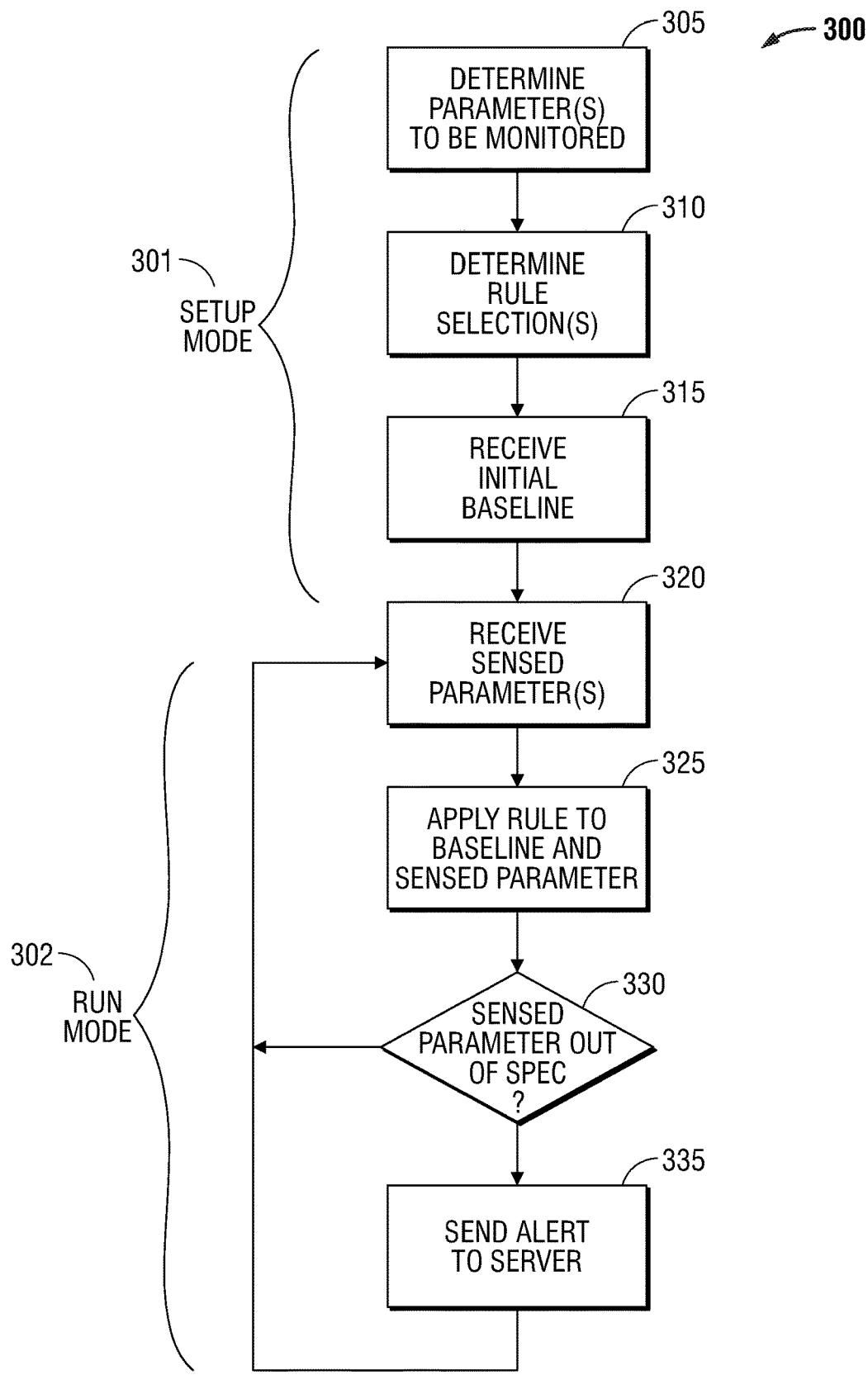
FIG. 4 is a block diagram representation of an embodiment of a method in accordance with the present disclosure.

Turning to FIG. 4, a method 300 of operating a data gathering device 50, 52 in accordance with the present disclosure is shown. The method 300 is characterized generally into a setup mode 301 and a run mode 302. During setup mode 301, one or more parameter(s) to be monitored are determined and entered into interface module 56 at step 305, and at step 310, one or more change rule(s) are selected and entered. In embodiments, steps 305 and/or 310 may be performed with user interface of selector unit 66, download port 69, and/or any other suitable input technique. At step 315, an initial baseline of the monitored parameters is established during this initial calibration phase. After completion of setup mode 301, run mode 302 may commence. During run mode 302, in step 320 change detection unit 62 receives the sensed parameter(s) defined in step 305. In step 325, change detection unit applies the change rule(s) to the sensed parameter, and in step 330 a determination is made whether the rule has been triggered (e.g., an out-of-range condition exists) and, if so, a message is caused to be sent to server 12. After the change rule is evaluated, the method iterates to step 320 and monitoring continues.

Figure 5A:
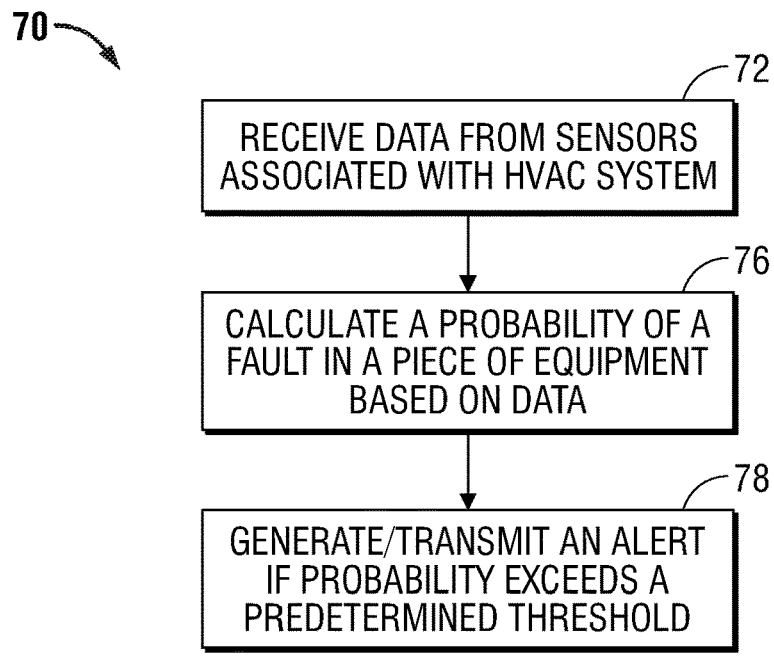
FIG. 5A is a block diagram representation of another embodiment of a method in accordance with the present disclosure.

FIG. 5A illustrates an embodiment of a method of the present disclosure to detect and diagnose faults in an HVAC system that is operably connected to a server 12 as described above. In accordance with the method 70, the server receives, at 72, data from sensors associated with the HVAC system. At 76, a probability of a fault in one or more of the pieces of the equipment is calculated based on the data received. An alert is then generated at 78 in response to the calculated probability of the fault exceeding a predetermined threshold.

The data received by the server includes measured data from each of the sensors and identifying criteria associated with the sensor. For example, if the sensor is embedded in, on, or is operatively connected to a piece of equipment in the HVAC system 16, the identifying criteria preferably identifies the piece of the equipment. Such identifying criteria may include a type, model, serial number, manufacturer, dealer, and so on associated with the equipment, and may also include a location of the equipment/sensor (a room, space, floor, building, or outside location, for example, where the equipment/sensor is located, and/or a geographic location). In some embodiments, data is also received from sensors co-located with, but not operably connected to any equipment. The identifying criteria may include a type of the sensor as well as location information (a room, space, floor, building, or outside location, for example, where the sensor is located, and/or a geographic location).

Because data from a number of sensors may be acquired by the remote server from different types of equipment and from different locations within the HVAC system, a system view of the performance or operation of the HVAC system at any particular time and under current known conditions is obtained in accordance with the present disclosure. This system-wide view enhances the capability of the system and methods of the present disclosure to accurately predict an equipment fault and alert the user to the impending fault before it occurs.

Figure 5B:
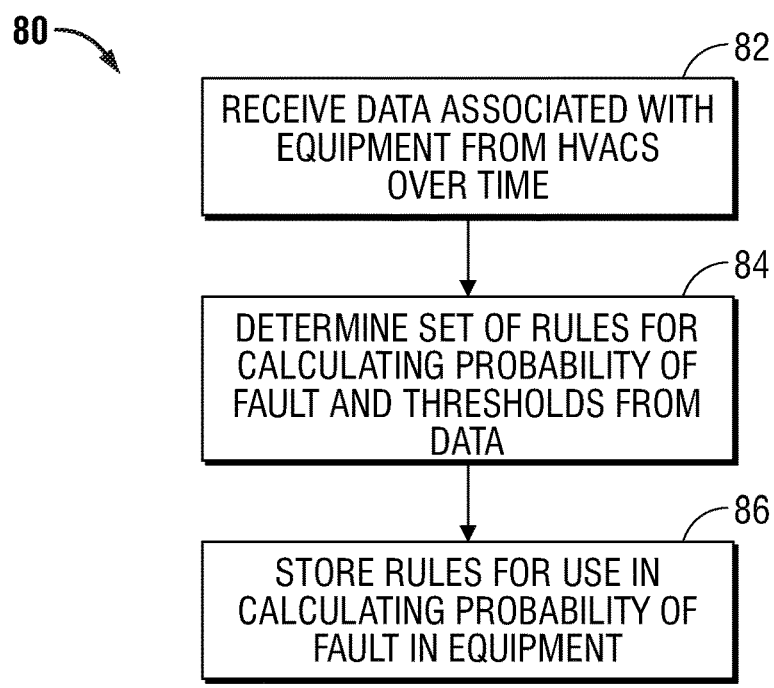
FIG. 5B is a block diagram representation of yet another embodiment of a method in accordance with the present disclosure.

Referring to FIG. 5B, in another embodiment 80, historical data is received by the server at 82 from sensors and equipment across a plurality of HVAC systems over a period of time. By analyzing the historical data associated with each type of equipment in the plurality of HVAC systems, algorithms, or a set of rules, for calculating the probability of faults associated with various types of equipment can be determined at 84 from the historical data, as well as threshold values for generating alerts. The rules can then be stored at 86 for use in calculating the probability of a particular fault occurring in a particular piece of equipment.

In embodiments, the threshold values indicate a probability that unacceptable degradation in performance or operation of a piece of equipment will continue if no action is taken. Accordingly, the methods of the present disclosure provide a means for alerting a user to a problem even before a fault actually occurs, thereby avoiding expensive damage. Preferably, a fault threshold value is also provided, such that probabilities above the fault threshold value indicate that a fault is already present, i.e., that the equipment is already operating outside acceptable operational ranges.

Figure 5C:
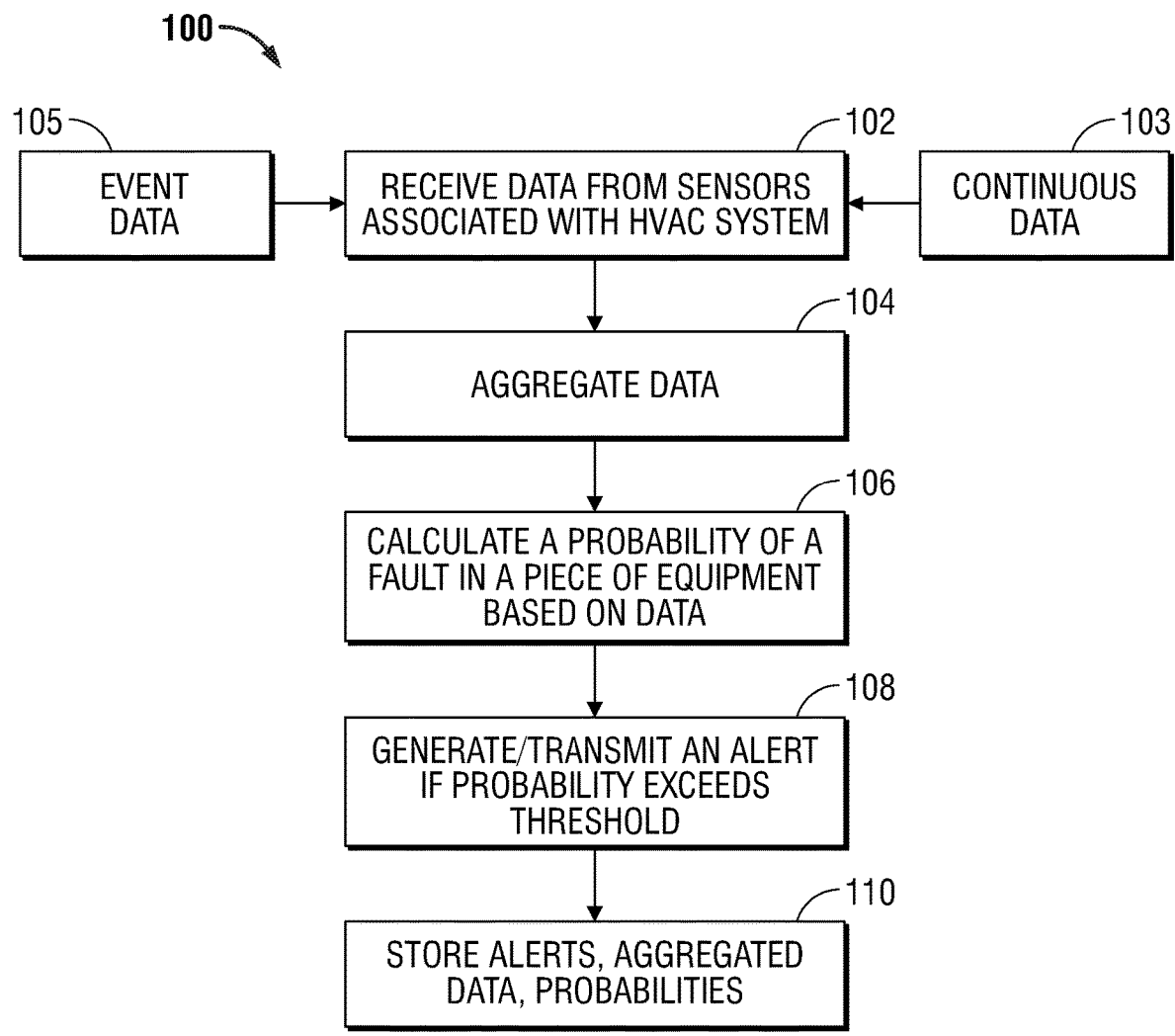
FIG. 5C is a block diagram representation of still another embodiment of a method in accordance with the present disclosure.

Referring to FIG. 5C, in accordance with another embodiment of a method 100 of the present disclosure, the server receives, at 102, data from sensors associated with the heating, ventilation and air conditioning system. The server receives certain continuous data 103 at predetermined intervals, and other data referred to as event data, upon occurrence of an event 105, such as, but not limited to, a change of state, operation, or condition (such as a power transition or cycling of the HVAC equipment), an exception, or a user-specified event. In some embodiments, a time stamp (date and time of day the data was generated) may be associated and collected with the continuous data and/or the record of the event. In accordance with other embodiments, the time-stamp may be added at the time the data is received.

The continuously received data and event-generated data is then aggregated at 104 and a probability of an equipment fault is calculated at 106 based on the aggregated data.

An alert, or fault notification, is then generated at 108 in response to the calculated probability of the fault exceeding a predetermined threshold and preferably automatically transmitted at the time the alert occurs to a user device and/or to a thermostat display. At 110, the alerts may be stored along with, optionally, the sensor data and probabilities of a fault associated with each piece of equipment.

In embodiments, more than one predetermined threshold may be determined for a piece of equipment. For example, a first and a second predetermined threshold may be provided. If the calculated threshold exceeds the first threshold, an alert with a fault notification may be generated, which serves to warn that correction is needed to a piece of equipment to avoid further degradation of the operating performance and, eventually, a fault or failure condition. If the calculated threshold further exceeds the second threshold, an alert is generated indicating that a fault has occurred.

In some embodiments, certain alerts may be accessible only to dealers and/or manufacturers, only to field service personnel, or only to the home owner or building manager, depending on the type of fault, for example. Some alerts may be accessible to any type of user. Access to the alerts may be provided, preferably based on user permissions, via a web-based service portal accessed via a computer or other suitable device. Such alerts may also be communicated to a suitable user device by text messages, emails, digital voice phone call or voice message, via a website log in to a web-based service, a web app, a smartphone app, and/or any other methods known in the art, when and as they occur.

In some embodiments, the transmission of alerts, or fault notifications, from the server to field service personnel or owners/operators of the HVAC systems can be manually triggered instead of automatically-generated, or can be a combination of both. For example, the content of an automatically-generated fault notification may be tailored for the appropriate field service personnel. Such field service notifications may then be manually forwarded to the owner/operator of the HVAC system by the field service personnel at his or her discretion, optionally after manually altering the notification, if appropriate. In some embodiments, the server can also be queried at any time by authorized users, e.g., by field personnel, the HVAC system manufacturer, or dealer, for the analysis to begin on a specific HVAC system, and/or for obtaining HVAC system data, and/or for the real-time and/or historical data analysis results for any one or multiple HVAC systems as appropriate and as needed.

Figure 5D:
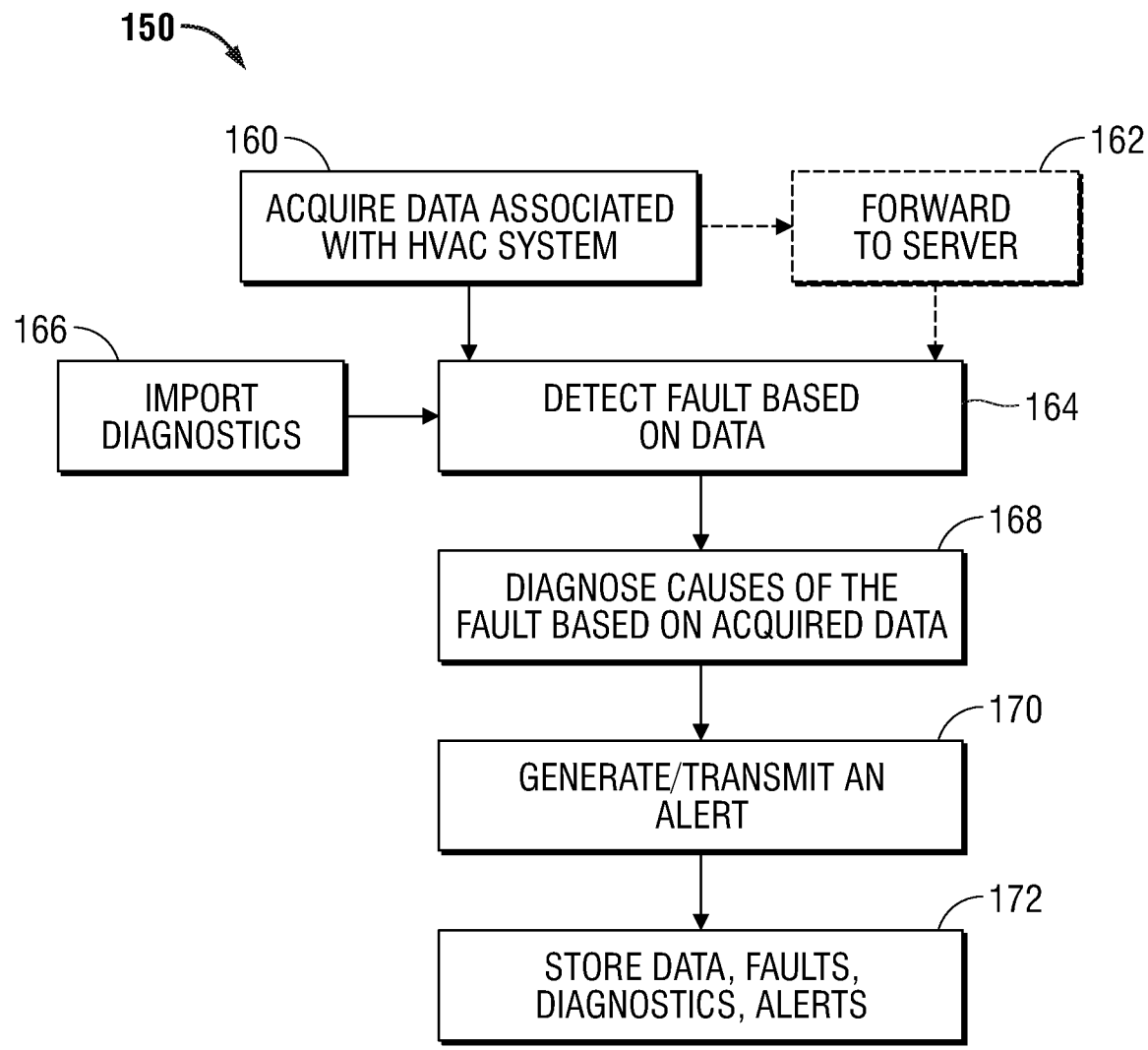
FIG. 5D is a block diagram representation of a further embodiment of a method in accordance with the present disclosure.

Additional embodiments of a method 150 are shown in FIG. 5D. At step 160, the measured data from the sensors is acquired by one of a dedicated data gathering device operably connected to the heating, ventilation and air conditioning system, a thermostat in the heating, ventilation, and air conditioning system, and a control unit in the heating, ventilation, and air conditioning system. In one embodiment, the acquired data is then forwarded at 162 to the server 12, optionally, in response to a query from the server.

At 164, a fault is indicated, for example, by a probability exceeding, or reaching, a predetermined threshold, and at 168 causes of the fault are diagnosed based on the acquired data. The detection and diagnosis in some embodiments are performed by the server after forwarding the data thereto. In other embodiments, the detection and diagnosis is performed by the dedicated data gathering device, the thermostat, or the control unit. In some embodiments, algorithms and information for performing the diagnostics are imported from a third-party server or database, or any type of computer, smart device, and so on associated with a dealer or manufacturer of the equipment.

An alert is then generated at 170 in response to detecting the fault and transmitted to a user device and/or to a thermostat display. At 172, the alerts of detected faults may be stored along with the diagnoses.

Figure 6:
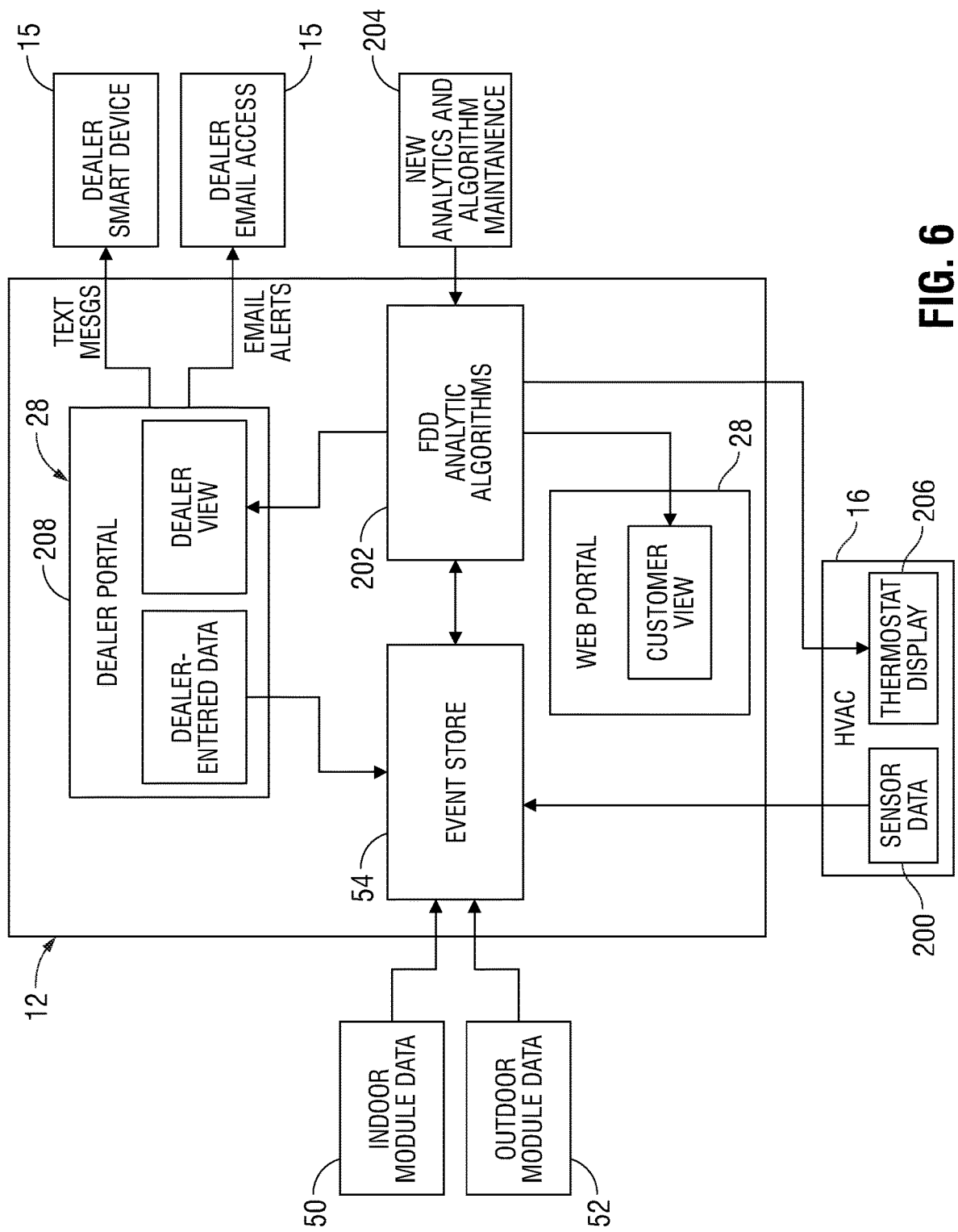
FIG. 6 is a system flow diagram representation of an embodiment of the present disclosure.

FIG. 6 provides a system flow diagram representation of various embodiments of methods of the present disclosure, summarizing a flow of data between sensors in the HVAC system 16, the server 12, and dealer 15 and homeowner devices 14 in accordance with embodiments of the present disclosure. In the embodiment shown, the sensor data 200 associated with the HVAC system 16 is received and analyzed by the server 12. In some embodiments, as shown, the analytic algorithms 202 for fault detection and diagnosis in accordance with the present disclosure are resident on the server 12 and can be easily upgraded with new analytics 204 as needed.

Once a fault is detected, it may be transmitted to a thermostat display 206 as well as to appropriate users via the Internet 28. For example, a dealer portal 208 is provided to a web-based service hosted on the server 12. Dealers can access certain data stored in the database 54 through the portal 208, which is related to the operation of the HVAC equipment monitored by the dealers, including information related to the fault detections and diagnoses generated in accordance with the present disclosure and stored in the database 54. Records of the events and also, preferably, historical logs of continuously generated sensor data are also stored in the database 54 and may be accessed by the dealers. Analytics of the historical sensor and event data may also be made available to the dealers through the portal 208. Sensor data 200 may be received by the server 12 via a thermostat in the HVAC system, as described herein, and/or via one or more dedicated data gathering device(s) 50, 52. Dealers may also enter data via the portal 208, such as diagnostic information, or baseline information on equipment which may be used by the server 12 to determine thresholds, for example, for indicating a fault.

It should be understood by those of ordinary skill in the art that while embodiments disclosed herein may refer to a homeowner operating an HVAC system associated with a single home, the system and methods of the present disclosure are not limited thereto and can be integrated with HVAC systems that allow management of a number of spaces or buildings in accordance with methods known to those of ordinary skill in the art.

ASPECTS

It is noted that any of aspects 1-8 below can be combined with each other in any combination and combined with any of aspects 9-25. Any of aspects 9-25 can be combined with each other in any combination.

Aspect 1. A data gathering device for use with HVAC equipment, comprising a controller; a diagnostic communication interface in operative communication with the controller; and an interface module in operative communication with the controller and configurable to measure an electrical property associated with an HVAC component and generate a sensor signal corresponding to the measured electrical property.

Aspect 2. The data gathering device in accordance with aspect 1, further comprising a LAN interface in operative communication with the controller; and wherein the controller is configured to bridge communications between the diagnostic communication interface and the LAN interface.

Aspect 3. The data gathering device in accordance with any of aspects 1-2, wherein the diagnostic interface is configured to communicate with a diagnostic data bus in accordance with a protocol selected from the group consisting of a CANbus protocol and a Z-Wave® protocol.

Aspect 4. The data gathering device in accordance with any of aspects 1-3, further comprising an exception module, comprising a baseline setting module operatively coupled to the controller and the interface module, the baseline setting module configured to determine a baseline parameter for the HVAC component; and a change detection module storing a parameter rule indicating an acceptable range for an operational parameter, the change detection module configured to receive the sensor signal, evaluate the sensor signal and the baseline parameter in accordance with the parameter rule, and to issue an exception message if the sensor signal is outside the accepted range defined by the parameter rule.

Aspect 5. The data gathering device in accordance with any of aspects 1-4, wherein the baseline parameter is determined by sampling an initial value of the measured electrical property.

Aspect 6. The data gathering device in accordance with any of aspects 1-5, wherein the exception message includes data selected from the group consisting of a data gathering device unique identifier, a data gathering device location, an exception identifier, a sensed parameter, a timestamp, and a unique sequence number.

Aspect 7. The data gathering unit in accordance with any of aspects 1-6, further comprising in operative communication with the interface module a profile database storing predetermined interface module settings in association with respective identifying characteristics of one or more HVAC components.

Aspect 8. The data gathering device in accordance with any of aspects 1-7, wherein the interface module further comprises an input buffer selectively configurable to receive an electrical property selected from the group consisting of voltage, current, and resistance.

Aspect 9. A method of monitoring an HVAC component, comprising selecting an electrical property of the HVAC component for monitoring; determining a baseline parameter of the HVAC component; storing the baseline parameter in a data collection unit; sensing the selected electrical property of the HVAC component during operation of the HVAC component; evaluating, at the data collection unit, the sensed electrical property to the baseline parameter in accordance with a change rule to determine whether the sensed electrical property is indicative of a fault in the HVAC component; and communicating an exception message to a diagnostic database in response to a determination that the sensed electrical property is indicative of a fault in the HVAC component.

Aspect 10. The method in accordance with aspect 9, wherein determining a baseline parameter includes measuring an electrical characteristic of the HVAC component when the HVAC component is operating without fault.

Aspect 11. The method in accordance with any of aspects 9-10, wherein determining a baseline parameter includes receiving, from a profile database, a predetermined baseline parameter for the HVAC equipment.

Aspect 12. The method in accordance with any of aspects 9-11, wherein the baseline parameter includes an acceptable range and the change rule includes determining whether the sensed electrical property is outside the acceptable range.

Aspect 13. The method in accordance with any of aspects 9-12, wherein the baseline parameter includes a rate of change and the change rule includes determining whether the sensed electrical property is changing at a rate greater than the rate of change.

Aspect 14. The method in accordance with any of aspects 9-13, wherein communicating an exception message includes transmitting the exception to a second data collection unit via a diagnostic data bus, and forwarding the exception message by the second data collection unit to the diagnostic database.

Aspect 15. The method in accordance with any of aspects 9-14, wherein communicating an exception includes transmitting the exception message via a diagnostic data bus to an HVAC device selected from the group consisting of a thermostat and an HVAC controller, and forwarding the exception message by the HVAC device unit to the diagnostic database.

Aspect 16. An HVAC diagnostic system, comprising a plurality of data gathering devices, each comprising an interface module configurable to measure an electrical property associated with an HVAC component, each of the plurality of data gathering devices configured to generate an exception message when the measured electrical property is anomalous; a diagnostic data bus joining the plurality of data gathering devices in operative communication, wherein at least of one of the data gathering devices of the plurality of data devices bridges the diagnostic data bus with a data network; and a server in operative communication with the data network and configured to receive an exception message from the at least one data gathering device, calculate a probability of a fault in HVAC component based on the received exception message, and generate an alert in response to the probability of the fault exceeding a predetermined threshold.

Aspect 17. The HVAC diagnostic system in accordance with aspect 16, wherein each of the plurality of data gathering devices further includes an exception module, comprising a baseline setting module operatively coupled to the controller and the interface module, the baseline setting module configured to determine a baseline parameter for the HVAC component; and a change detection module storing a parameter rule indicating an acceptable range for an operational parameter, the change detection module configured to receive the sensor signal, evaluate the sensor signal and the baseline parameter in accordance with the parameter rule, and to issue an exception message if the sensor signal is outside the accepted range defined by the parameter rule.

Aspect 18. The HVAC diagnostic system in accordance with any of aspects 16-17, wherein the baseline parameter is determined by sampling an initial value of the measured electrical property.

Aspect 19. The HVAC diagnostic system in accordance with any of aspects 16-18, wherein the exception message includes data selected from the group consisting of a data gathering device unique identifier, a data gathering device location, an exception identifier, a sensed parameter, a timestamp, and a unique sequence number.

Aspect 20. The HVAC diagnostic system in accordance with any of aspects 16-19, further comprising a database in operative communication with the server, wherein the exception message includes event data comprising a record of an exception event and a date and time of occurrence of the exception event, wherein the server is further configured to aggregate the event data; calculate the probability of the fault based on the aggregated data; and store, in the database, the aggregated data, the probability calculated, and a record of the alert generated.

Aspect 21. An HVAC diagnostic system for use with an HVAC system, comprising a plurality of data gathering devices, each comprising an interface configured to measure a property associated with the HVAC system; a diagnostic data bus joining the plurality of data gathering devices in operative communication, wherein at least one of the data gathering devices of the plurality of data devices bridges the diagnostic data bus with a data network; a server in operative communication with the data network and configured to receive data from at least one data gathering device, determine HVAC system faults utilizing the received data, and generate alerts in response.

Aspect 22. The HVAC diagnostic system in accordance with aspect 21, wherein the diagnostic data bus is independent of an HVAC system control bus.

Aspect 23. The HVAC diagnostic system in accordance with any of aspects 21-22, wherein the property associated with the HVAC system is selected from the group consisting of a physical parameter and an electrical parameter.

Aspect 24. The HVAC diagnostic system in accordance with any of aspects 21-23, wherein the interface is further configured to communicate with a data port associated with the HVAC system.

Aspect 25. The HVAC diagnostic system in accordance with any of aspects 21-24, wherein the data gathering device is further configured to receive data from the data port; and transmit the data received from the data port to the server.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method of monitoring an HVAC component via a dedicated diagnostic data bus, comprising:
    selecting an electrical property of the HVAC component for monitoring;
    communicating, via a control data bus that differs from the dedicated diagnostic data bus, instructions that activate operation of the HVAC component;
    based on operation of the HVAC component, determining a baseline parameter of the electrical property of the HVAC component;
    storing the baseline parameter in a data collection unit;
    sensing the selected electrical property of the HVAC component during subsequent operation of the HVAC component;
    receiving, via the dedicated diagnostic data bus, at the data collection unit, the sensed electrical property and evaluating the sensed electrical property relative to the baseline parameter in accordance with a change rule to determine whether the sensed electrical property is indicative of a fault in the HVAC component; and
    communicating, via the dedicated diagnostic data bus, an exception message to a diagnostic database in response to a determination that the sensed electrical property is indicative of a fault in the HVAC component.

2. The method in accordance with claim 1, wherein determining a baseline parameter includes measuring an electrical characteristic of the HVAC component when the HVAC component is operating without fault.

3. The method in accordance with claim 1, further comprising:
    receiving, from a profile database, a predetermined baseline parameter for the HVAC equipment; and
    comparing the baseline parameter to the predetermined baseline parameter.

4. The method in accordance with claim 1, wherein the baseline parameter includes an acceptable range and the change rule includes determining whether the sensed electrical property is outside the acceptable range.

5. The method in accordance with claim 1, wherein the baseline parameter includes a rate of change and the change rule includes determining whether the sensed electrical property is changing at a rate greater than the rate of change.

6. The method in accordance with claim 1, wherein communicating an exception message includes transmitting the exception to a second data collection unit via the dedicated diagnostic data bus, and forwarding the exception message by the second data collection unit to the diagnostic database.

7. The method in accordance with claim 1, wherein communicating an exception message includes transmitting the exception message via the dedicated diagnostic data bus to an HVAC device selected from the group consisting of a thermostat and an HVAC controller, and forwarding the exception message by the HVAC device unit to the diagnostic database.

* * * * *